US012000546B1

(12) United States Patent
Liang

(10) Patent No.: US 12,000,546 B1
(45) Date of Patent: Jun. 4, 2024

(54) LAMP WICK STRUCTURE AND LAMP

(71) Applicant: Nanning Wang Choi Lighting Technology Co., Ltd., Nanning (CN)

(72) Inventor: Faquan Liang, Nanning (CN)

(73) Assignee: Nanning Wang Choi Lighting Technology Co., Ltd., Nanning (CN)

( * ) Notice: Subject to any disclaimer, the term of this patent is extended or adjusted under 35 U.S.C. 154(b) by 0 days.

(21) Appl. No.: 18/210,673

(22) Filed: Jun. 16, 2023

(30) Foreign Application Priority Data

May 31, 2023 (CN) ......................... 202321371509.8

(51) Int. Cl.
*F21K 9/238* (2016.01)
*F21V 9/40* (2018.01)
*F21V 17/16* (2006.01)
*F21Y 103/10* (2016.01)
*F21Y 115/10* (2016.01)

(52) U.S. Cl.
CPC ................ *F21K 9/238* (2016.08); *F21V 9/40* (2018.02); *F21V 17/164* (2013.01); *F21Y 2103/10* (2016.08); *F21Y 2115/10* (2016.08)

(58) Field of Classification Search
CPC ........... F21K 9/238; F21V 9/40; F21V 17/164
See application file for complete search history.

(56) References Cited

U.S. PATENT DOCUMENTS 6,022,241 A * 2/2000 Lin ...................... H01R 4/2412 439/619
11,644,160 B1 * 5/2023 Xu ........................ F21V 31/005 362/217.14
2007/0153531 A1 * 7/2007 Lin ........................... F21S 4/10 362/362
2009/0086492 A1 * 4/2009 Meyer ..................... F21V 29/85 362/294
2013/0107523 A1 * 5/2013 Takeda .................... F21V 13/02 362/235
2013/0162139 A1 * 6/2013 Liu ......................... F21V 29/51 315/51
2015/0211717 A1 * 7/2015 Liu ....................... F21V 7/0066 362/310
2020/0332962 A1 * 10/2020 Chen ...................... H05B 45/20

* cited by examiner

*Primary Examiner* — Christopher E Dunay

(57) ABSTRACT

Provided are a lamp wick structure and a lamp, comprising a lamp housing, a lamp cap, a conversion connector and a lamp wick assembly, the lamp housing comprises a lighting part with a lighting cavity, and an annual opening part communicating with the lighting cavity; the conversion connector comprises a first connecting piece and a second connecting piece; the first connecting piece comprises a clamping slot and a groove arranged at opposite ends; the lamp housing is clamped in the clamping slot, and the lighting cavity communicates with the clamping slot through the annular opening part 103; an opening of the groove is located at one end of the first connecting piece away from the lighting cavity, and the second connecting piece is inserted into the groove in an interference manner; the lamp cap is sleeved on an outer side wall of the first connecting piece and covers the groove.

10 Claims, 4 Drawing Sheets

LAMP WICK STRUCTURE AND LAMP

CROSS REFERENCE TO RELATED APPLICATIONS

The present application claims the benefit of Chinese Patent Application No. 202321371509.8 filed on May 31, 2023, the contents of which are incorporated herein by reference in their entirety.

TECHNICAL FIELD

The present application belongs to the technical field of lighting, in particular to a lamp wick structure and a lamp.

BACKGROUND

At present, large-caliber bulbs usually need to be equipped with large-size lamp cap and mounting base, but the manufacturing costs of large-size lamp cap and mounting base are relatively high, and they take up a lot of space, which leads to problems of large overall size, high cost and poor applicability of the bulb. In the prior art, there is an integrated lamp cap which is extended on the opening based on the original lamp cap, and the size of the lamp cap is reduced through the integrated design, but the manufacturing process of this lamp cap is complex, the cost is high, and the material covering the opening is a metal conductor, thus the use safety is poor.

SUMMARY

The present application provides a lamp wick structure and a lamp, aiming at solving the problems of large-caliber light bulbs in the prior art, such as large overall size, high cost and the like.

In view of the above technical problems, the embodiment of the present application provides a lamp wick structure, including a lamp housing, a lamp cap, a conversion connector and a lamp wick assembly installed on the conversion connector and electrically connected with the lamp cap, the lamp housing includes a lighting part with a lighting cavity, and an annual opening part communicating with the lighting cavity;

the conversion connector includes a first connecting piece and a second connecting piece; the first connecting piece includes a clamping slot and a groove arranged at opposite ends; the lamp housing is clamped in the clamping slot, and the lighting cavity communicates with the clamping slot through the annular opening part 103; an opening of the groove is located at one end of the first connecting piece away from the lighting cavity, and the second connecting piece is inserted into the groove in an interference manner; the lamp cap is sleeved on an outer side wall of the first connecting piece and covers the groove.

Optionally, an inner side wall of the groove and an end of the second connecting piece away from the lighting cavity enclose a sealing groove; the lamp wick structure further includes a first sealant layer filled in the sealing groove.

Optionally, the first connecting piece includes a mounting part, and the clamping slot is arranged on the mounting part; the mounting part includes a support ring arranged in the clamping slot; a clamping space for clamping the lamp housing is formed between an outer side wall of the support ring and an inner side wall of the clamping slot.

Optionally, the support ring includes an annular support part connected with an inner side wall of the annular opening part in an interference manner, and a first guide part for guiding the lamp housing to be inserted into the clamping space; and/or the lamp wick structure further includes a second sealant layer filled in the clamping space.

Optionally, the first connecting piece includes a mounting part, a connecting arm and a conversion part, and the clamping slot is arranged on the mounting part, the groove is arranged on the conversion part, the connecting arm is connected between the mounting part and the conversion part, the conversion part and the mounting part are both cylindrical, the connecting arm is in a frustum shape; the conversion part, the mounting part and the connecting arm are all coaxially arranged, a radius of the conversion part is smaller than that of the mounting part; and the lamp cap is sleeved on an outer side wall of the conversion part.

Optionally, one end of the second connecting piece near the lighting cavity is provided with a second guide part for guiding the second connecting piece to be inserted into the groove.

Optionally, the lamp cap is provided with a first electrode and a second electrode; and the lamp wick assembly includes a light source assembly installed on the first connecting piece and positioned in the lighting cavity, a first circuit route electrically connected between the first electrode and a first end of the light source assembly, and a second circuit route electrically connected between the second electrode and a second end of the light source assembly.

Optionally, the first connecting piece is provided with a first through hole and a second through hole, the first through hole and the second through hole are communicated between the groove and the lighting cavity; one end of the first circuit route is electrically connected with the first end of the light source assembly through the first through hole, and another end is electrically connected with the first electrode; one end of the second circuit route is electrically connected with the second end of the light source assembly through the second through hole, and another end is electrically connected with the second electrode.

Optionally, the first circuit route includes a first electronic component, a first wire electrically connected between the first electronic component and the first end of the light source assembly, and a second wire electrically connected between the first electronic component and the first electrode; the second circuit route includes a second electronic component, a third wire electrically connected between the second electronic component and the second end of the light source assembly, and a fourth wire electrically connected between the second electronic component and the second electrode; the first electronic component is a resistance element, a constant current IC element or a metal wire; the second electronic component is a resistance element, a constant current IC element or a metal wire; and/or the light source assembly is a filament LED light source element or a planar LED light source element.

The present application also provides a lamp, which includes the lamp wick structure.

According to the present application, the lamp wick structure includes a lamp housing, a lamp cap, a conversion connector and a lamp wick assembly installed on the conversion connector and electrically connected with the lamp cap, the lamp housing includes a lighting part with a lighting cavity, and an annual opening part communicating with the lighting cavity; the conversion connector includes a first connecting piece and a second connecting piece; the first connecting piece includes a clamping slot and a groove arranged at opposite ends; the lamp housing is clamped in the clamping slot, and the lighting cavity communicates with the clamping slot through the annular opening part 103; an opening of the groove is located at one end of the first connecting piece away from the lighting cavity, and the second connecting piece is inserted into the groove in an interference manner; the lamp cap is sleeved on an outer side wall of the first connecting piece and covers the groove.

In the present application, the annular opening part of the lamp housing is inserted into the clamping slot of the first connecting piece, and the second connecting piece is inserted into the groove of the first connecting piece in an interference manner; the lamp cap is sleeved on the outer side wall of the first connecting piece, so that the lamp wick assembly, lamp cap and lamp housing are installed through the first connecting piece and the second connecting piece, and the structure is simple and the assembly is easy. The above assembly solution realizes that the lamp cap and lamp housing are separately installed at both ends of the first connecting piece, and the installation caliber (i.e. annular opening) of the lamp housing and the installation size of the lamp cap can be set as required. That is, the two ends of the first connecting piece are set to different sizes, so that the large caliber of the large-sized lamp housing is installed in the clamping slot of the larger end of the first connecting piece. Meanwhile, the lamp cap with a relatively smaller size is assembled on the outer wall of the smaller end of the first connecting piece. In this way, the large-sized lamp housing and small-sized lamp cap can be installed through the first connecting piece at the same time, hence saving the installation space. The lamp cap is sleeved on the outer side wall of the first connecting piece and covers the groove, so that all components in the lamp housing and the lamp cap can be protected, thereby prolonging the product life and being more environmentally friendly. The overall structure of the lamp wick of the present application is simple and reasonable, and the matched connection mode among the components allows each part of the lamp wick structure to be quickly assembled into a final product, which improves the manufacturing efficiency, reduces the manufacturing cost, and the structure of the present application is simple.

BRIEF DESCRIPTION OF THE DRAWINGS

The present application will now be further illustrated with the attached drawings and following embodiments.

Figure 1:
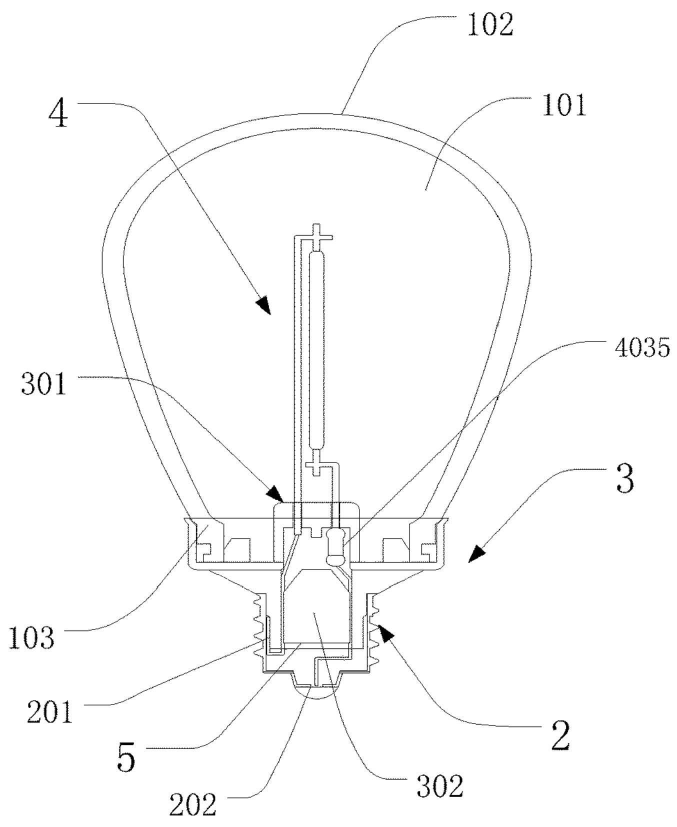
FIG. 1 is a schematic structural diagram of a lamp wick structure provided by an embodiment of the present application.

The reference signs in the drawings are as follows:

1—lamp housing; 101—lighting cavity; 102—lighting part; 103—annular opening part; 2—lamp cap; 201—first electrode; 202—second electrode; 3—conversion connector; 301—first connecting piece; 3010—groove; 3011—mounting part; 30110—clamping slot; 30112—support ring; 30113—annular support part; 30114—first guide part; 3015—connecting arm; 3016—conversion part; 3013—first through hole; 3014—second through hole; 302—second connecting piece; 3020—second guide part; 4—lamp wick assembly; 401—light source assembly; 402—first circuit route; 403—second circuit route; 4030—first electronic component; 4031—first wire; 4032—second wire; 4033—third wire; 4034—fourth wire; 4035—second electronic component; 5—sealing groove; 6—first sealant layer; 7—second sealant layer.

DETAILED DESCRIPTION THE PREFERRED EMBODIMENTS

In order to make the beneficial effects, technical solutions and technical problems solved by the present application clearer, the present application will be further illustrated in detail with reference to the drawings and embodiments. It should be understood that the specific embodiments described here are merely for illustrating the present application, not for limiting the present application.

It should be understood that the directions or positional relationships indicated by the terms "upper", "lower", "left", "right", "front", "back" and "middle" are based on the directions or positional relationships shown in the drawings, only for convenience of describing the present application and simplifying the descriptions, instead of indicating or implying that the device or element must have a specific orientation, be constructed or operated in a specific orientation, and therefore cannot be understood as a limitation of the present application.

As shown in FIG. 1 to FIG. 5, an embodiment of the present application provides a lamp wick structure and a lamp. The structure includes a lamp housing 1, a lamp cap 2, a conversion connector 3 and a lamp wick assembly 4 installed on the conversion connector 3 and electrically connected with the lamp cap 2, the lamp housing 1 includes a lighting part 102 having a lighting cavity 101, and an annular opening part 103 communicating with the lighting cavity 101. The conversion connector 3 includes a first connecting piece 301 and a second connecting piece 302; the first connecting piece 301 includes a clamping slot 30110 and a groove 3010 arranged at opposite ends; the lamp housing 1 is clamped in the clamping slot 30110, and the lighting cavity 101 communicates with the clamping slot 30110 through the annular opening part 103. An opening of the groove 3010 is located at one end of the first connecting piece 301 away from the lighting cavity 101, and the second connecting piece 302 is inserted into the groove 3010 in an interference manner; the lamp cap 2 is sleeved on an outer side wall of the first connecting piece 301 and covers the groove 3010. Specifically, the assembly processes of the lamp wick structure may be as follows: firstly, the lamp wick assembly 4 is mounted and fixed on the conversion connector 3, and then the second connecting piece 302 is inserted into the groove 3010 of the first connecting piece 301 in an interference manner; then the lamp housing 1 is plugged into the clamping slot 30110 of the first connecting piece 301 (at this state, the lamp wick assembly 4 is located in the lighting cavity 101); finally, the lamp cap 2 is sleeved on the outer side wall of the first connecting piece 301. In this way, the conversion connector 3, lamp cap 2 and lamp housing 1 are quickly assembled. Understandably, the sequence of the above assembly processes may be adjusted according to actual needs. The lamp cap 2 and lamp housing 1 are separately installed at both ends of the first connecting piece 301, and the installation caliber (i.e., annular opening) of the lamp housing 1 and the installation size of the lamp cap 2 may be set as required. That is, the two ends of the first connecting piece 301 are set to different sizes, the large diameter of the large-sized lamp housing 1 is installed in the clamping slot 30110 set at the larger end of the first connecting piece 301; meanwhile, the lamp cap 2 with a relatively smaller size is assembled on the outer wall of the smaller end of the first connecting piece 301. In this way, the large-sized lamp housing 1 and the small-sized lamp cap 2 may be mounted through the first connecting piece 301 at the same time, thereby saving the installation space.

In the present application, both the first connecting piece 301 and the second connecting piece 302 may be made of insulating plastic or rubber materials. In this embodiment, the second connecting piece 302 may be configured as a solid body structure or a hollow body structure. The hollow body structure can save materials, and also reduce the weight of the whole lamp wick structure.

In the lamp wick structure of the above embodiment of the present application, the lamp wick assembly 4, lamp cap 2 and lamp housing 1 are installed through the first connecting piece 301 and the second connecting piece 302, which has simple structure and is easy to assemble. The lamp housing 1 is plugged into the clamping slot 30110 of the first connecting piece 301. The lamp cap 2 is sleeved on the outer side wall of first connecting piece 301 and covers the groove 3010 to block the annular opening part 103. In this way, the lamp housing 1 and lamp cap 2 may be installed separately, the size of the mounting base of the lamp cap 2 may be set as required, and all components in the lamp housing 1 and lamp cap 2 are protected.

Thereby the service life of the product is prolonged and it is more environmentally friendly. The whole lamp wick structure of the present application is simple and reasonable, and the assembly mode is fast, which reduces the production cost. In the present application, the lamp cap 2, lamp housing 1 and conversion connector 3 are connected in a mutually fitting manner, so that the lamp wick structure has strong firmness, and the components may be quickly assembled into a final product, thus the manufacturing efficiency is improved and the manufacturing cost is reduced.

Figure 2:
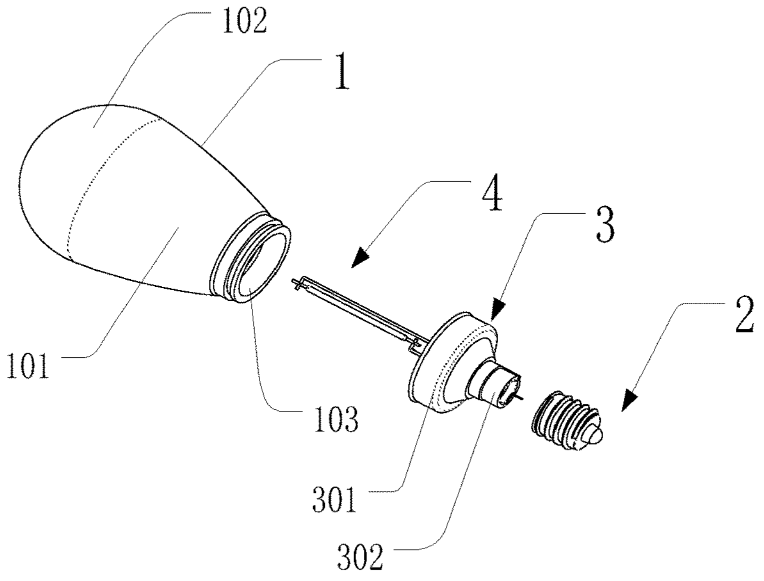
FIG. 2 is a schematic exploded structure diagram of a lamp wick structure provided by an embodiment of the present application.
Figure 3:
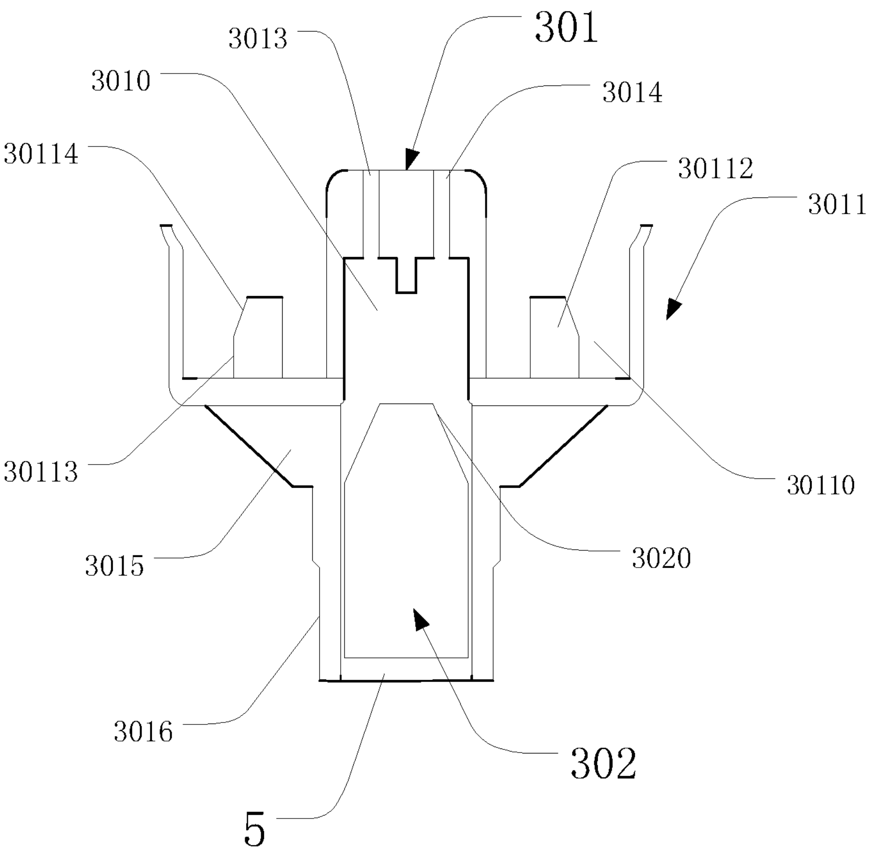
FIG. 3 is a schematic structural diagram of a conversion connector of a lamp wick structure provided by an embodiment of the present application.

In an embodiment, referring to FIGS. 1-3, the inner side wall of the groove 3010 and the end of the second connecting piece 302 away from the lighting cavity 101 enclose a sealing groove 5. The lamp wick structure also includes a first sealant layer 6 filled in the sealing groove 5. Understandably, the second connecting piece 302 is inserted into the groove 3010 in an interference manner, and the end of the second connecting piece 302 has a certain distance from the edge of the inner side wall in the opening direction of the groove 3010, the distance is the height of the sealing groove 5. After the sealing groove 5 is filled with sealant, the first sealant layer 6 is formed. The lamp wick assembly 4 mounted on the conversion connector 3 may avoid contact with external water and play a sealing and protection role. External water cannot enter the groove 3010 and lighting cavity 101, which has obvious waterproof effect and can prolong its service life.

Figure 4:
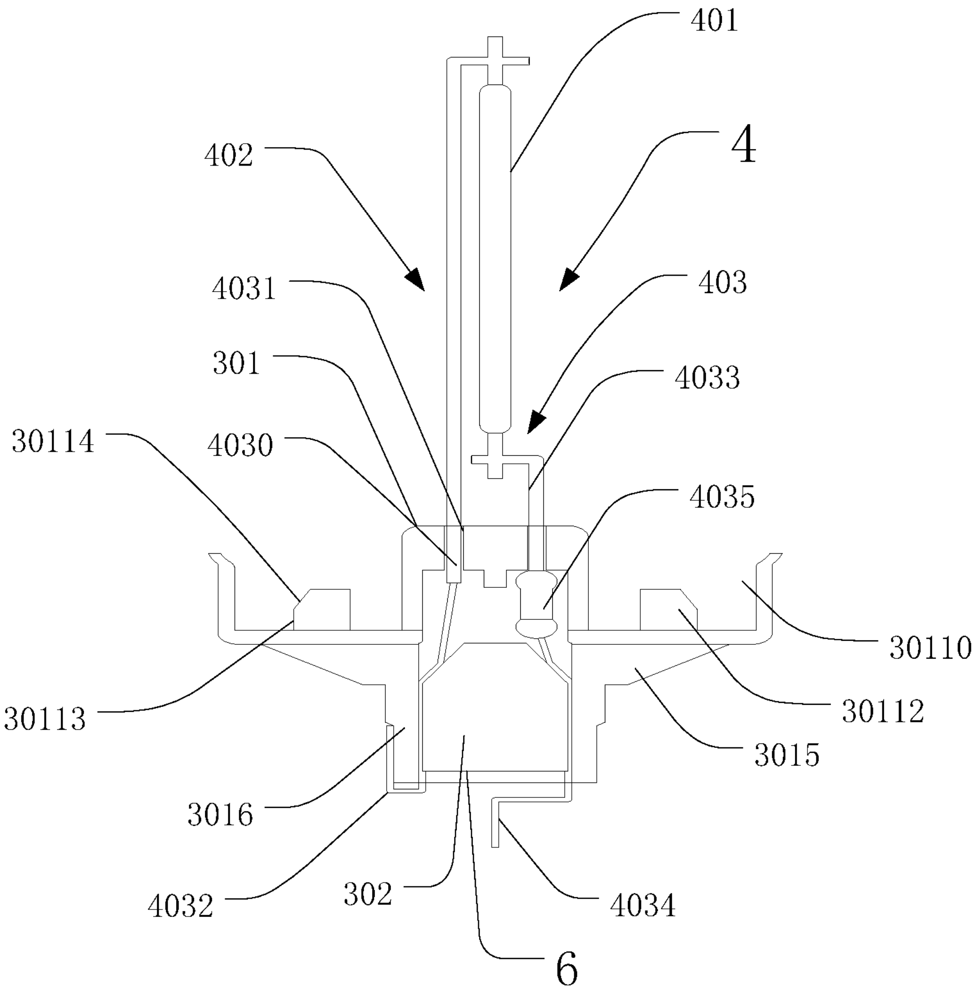
FIG. 4 is a schematic structural diagram when the light source assembly is a filament LED light source element in a lamp wick structure provided by an embodiment of the present application.

In an embodiment, referring to FIGS. 3 and 4, the first connecting piece 301 includes a mounting part 3011, and the clamping slot 30110 is arranged on the mounting part 3011; the mounting part 3011 includes a support ring 30112 arranged in the clamping slot 30110; a clamping space for clamping the lamp housing 1 is formed between the outer side wall of the support ring 30112 and the inner side wall of the clamping slot 30110. Understandably, it is only needs to insert the annual opening part 103 of the lamp housing 1 into the clamping space, and the annual opening part 103 can be quickly clamped in the clamping space between the support ring 30112 and the mounting part 3011. The fitting connection mode between the lamp housing 1 and the conversion connector 3 is simple and easy to operate, which improves the assembly speed.

In some embodiments, the mounting part 3011 and the support ring 30112 may adopt an integrated structure to increase the stability of the structure.

In an embodiment, referring to FIG. 3, the support ring 30112 includes an annular support part 30113 connected with the inner wall of the annular opening part 103 in an interference manner, and a first guide part 30114 for guiding the lamp housing 1 to be inserted into the clamping space. That is, the first guide part 30114 can guide the annual opening part 103 of the lamp housing 1 inserted into the clamping space, and then the annual opening part 103 is smoothly inserted into the clamping space, so as to complete the installation of the lamp housing 1.

In other embodiments, referring to FIG. 4, the lamp wick structure further includes a second sealant layer 7 filled in the clamping space. When the annual opening part 103 is successfully inserted into the clamping slot 30110, sealant is filled in the clamping space to form the second sealant layer 7, which is not only waterproof, but also can seal and fix the annual opening part 103 of the plastic lamp housing 1 in the clamping slot 30110.

Figure 5:
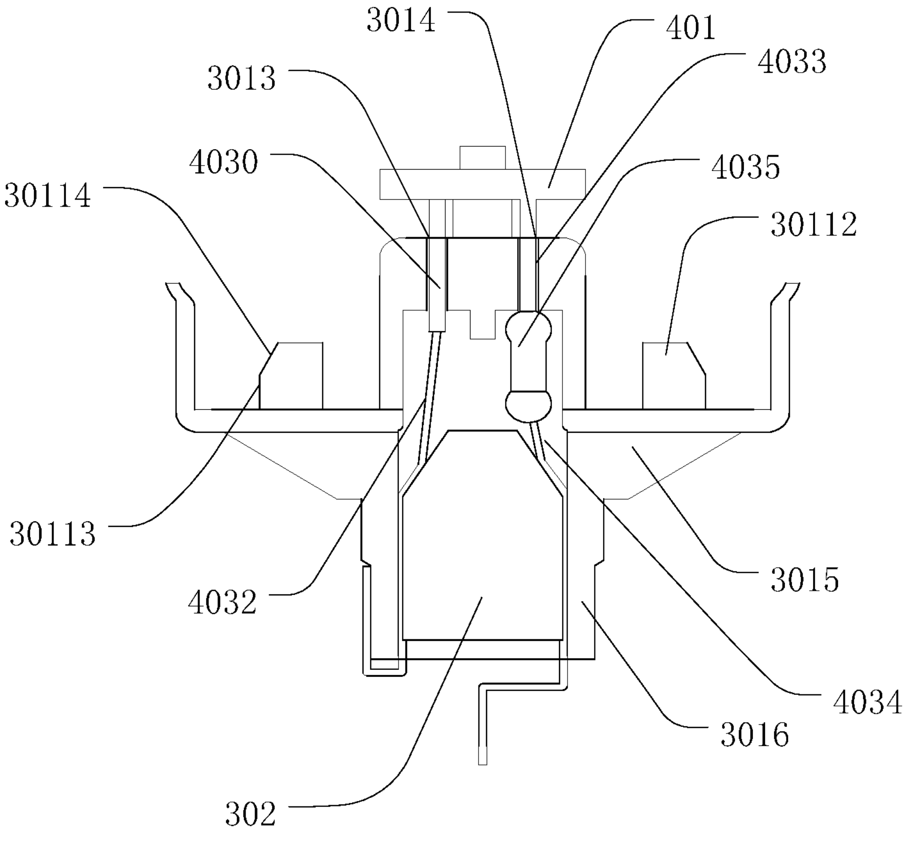
FIG. 5 is a schematic structural diagram of the installation when the light source assembly is a planar LED light source element in a lamp wick structure provided by an embodiment of the present application.

In an embodiment, referring to FIGS. 3-5, the first connecting piece 301 includes a mounting part 3011, a connecting arm 3015 and a conversion part 3016. The clamping slot 30110 is arranged on the mounting part 3011, and the groove 3010 is arranged on the conversion part 3016. The connecting arm 3015 is connected between the mounting part 3011 and the conversion part 3016, the conversion part 3016 and the mounting part 3011 are both cylindrical, and the connecting arm 3015 is shaped like a truncated cone. The conversion part 3016, the mounting part 3011 and the connecting arm 3015 are all coaxially arranged, and the radius of the conversion part 3016 is smaller than that of the mounting part 3011. The lamp cap 2 is sleeved on the outer side wall of the conversion part 3016. Further, the radius of the conversion part 3016 is smaller than that of the mounting part 3011, so that the large-sized lamp housing 1 with large caliber is installed in the clamping slot 30110 arranged in the mounting part 3011 with larger radius. At the same time, the lamp cap 2 with a relatively small size is sleeved on the outer wall of the conversion part 3016 with a smaller radius and covers the groove 3010. That is, the large-sized lamp housing 1 and the small-sized lamp cap 2 can be installed through the first connecting piece 301 at the same time, thereby saving the installation space.

In an embodiment, referring to FIG. 3, one end of the second connecting piece 302 near the lighting cavity 101 is provided with a second guide part 3020 for guiding the second connecting piece 302 to be inserted into the groove 3010. That is, the second guide part 3020 can guide the second connecting piece 302 plugged into the groove 3010, and then the second connecting piece 302 is smoothly inserted into the groove 3010, so as to complete the assembly between the second connecting piece 302 and the first connecting piece 301.

In an embodiment, referring to FIGS. 1, 4 and 5, the lamp cap 2 is provided with a first electrode 201 and a second electrode 202; the lamp wick assembly 4 includes a light source assembly 401 mounted on the first connecting piece 301 and located in the lighting cavity 101, a first circuit route 402 electrically connected between the first electrode 201 and a first end of the light source assembly 401, and a second circuit route 403 electrically connected between the second electrode 202 and a second end of the light source assembly 401. Understandably, the first electrode 201, the first circuit route 402, the first end of the light source assembly 401, the second circuit route 403 and the second electrode 202 sequentially form a circuit loop of the lamp wick assembly 4. When the external power supply of the lamp wick structure is connected to the lamp wick assembly 4 through the lamp cap 2, the lamp wick assembly 4 works, and the light source assembly 401 emits light in the lighting cavity to provide illumination to the outside.

Further, referring to FIG. 4, the first connecting piece 301 is provided with a first through hole 3013 and a second through hole 3014, the two holes communicate between the groove 3010 and the lighting cavity 101; one end of the first circuit route 402 is electrically connected with the first end of the light source assembly 401 through the first through hole 3013, and another end is electrically connected with the first electrode 201. One end of the second circuit route 403 is electrically connected to the second end of the light source assembly 401 through the second through hole 3014, and the other end is electrically connected to the second electrode 202. That is, one end of the first circuit route 402 is electrically connected with the first end of the light source assembly 401 through the first through hole 3013, and another end is electrically connected with the first electrode 201 of the lamp cap 2. One end of the second circuit route 403 is electrically connected with the second end of the light source assembly 401 through the second through hole 3014, and another end is electrically connected with the second electrode 202 of the lamp cap 2. The first through hole 3013 and the second through hole 3014 are directly arranged on the top wall of the supporting part of the first connecting piece 301, so that the space of the conversion connector 3 is reasonably utilized and the structure is compact. Preferably, the first through hole 3013 and the second through hole 3014 are both circular through holes or square through holes.

In an embodiment, referring to FIGS. 4 and 5, the first circuit route 402 includes a first electronic component 4030, a first wire 4031 electrically connected between the first electronic component 4030 and the first end of the light source assembly 401, and a second wire 4032 electrically connected between the first electronic component 4030 and the first electrode 201. The second circuit route 403 includes a second electronic component 4035, a third wire 4033 electrically connected between the second electronic component 4035 and the second end of the light source assembly 401, and a fourth wire 403 electrically connected between the second electronic component 4035 and the second electrode 202. The second electronic component is a resistance element, a constant current IC element or a metal wire. In this embodiment, the electronic component 4030 in the second circuit route 403 is installed in the groove 3010 and positioned on the top wall of the second connecting piece 302, and the interference insertion installation between the second connecting piece 302 and the first connecting piece 301 can support and fasten the first circuit route 402 and the second circuit route 403. Preferably, the first electronic component 4030 includes, but is not limited to, a resistance element or a constant current IC element or a metal wire. The second electronic component 4035 includes, but is not limited to, a resistance element or a constant current IC element or a metal wire. Referring to FIG. 4, the light source assembly 401 is a filament LED light source element. In another embodiment, referring to FIG. 5, the light source assembly 401 is a planar LED light source element.

The present application also provides a lamp, referring to FIG. 1-FIG. 5, including the lamp wick structure mentioned above. The light source assembly 401 is a filament LED light source element or a planar LED light source element. In the lamp of the above embodiment of the present application, the lamp housing 1 is plugged into the clamping slot 30110 of the mounting part 3011 of the first connecting piece 301. The lamp cap 2 is sleeved on the conversion part 3016 of the outer wall of the first connecting piece 301, and the conversion part 3016 and the mounting part 3011 are oppositely arranged in the length direction of the first connecting piece 301. Therefore, the lamp cap 2 and the lamp housing 1 can be mounted in a split manner, and the mounting caliber of the lamp housing 1 and the size of the mounting base of the lamp cap 2 can be set as required. That is, the large-sized lamp housing 1 can be mounted in the clamping slot 30110 of the first connecting piece 301, and the lamp cap 2 with a relatively smaller size can be assembled on the outer wall of the first connecting piece 301, thus saving the installation space. The whole lamp wick structure of the present application is simple and reasonable, and the assembly mode is fast, which reduces the production cost. In the present application, the lamp cap 2, lamp housing 1 and conversion connector 3 are connected in a mutually fitting manner, so that the lamp wick structure has strong firmness, and the components may be quickly assembled into a final product, thus the manufacturing efficiency is improved and the manufacturing cost is reduced.

The above descriptions are only preferred embodiments of the present application and are not intended to limit the present application. Any modifications, equivalent substitutions and improvements made within the spirit and principle of the present application shall be included in the protection scope of the present application.

What is claimed is:

1. A lamp wick structure, comprising a lamp housing, a lamp cap, a conversion connector and a lamp wick assembly installed on the conversion connector and electrically connected with the lamp cap, the lamp housing comprises a lighting part with a lighting cavity, and an annual opening part communicating with the lighting cavity;

the conversion connector comprises a first connecting piece and a second connecting piece; the first connecting piece comprises a clamping slot and a groove arranged at opposite ends; the lamp housing is clamped in the clamping slot, and the lighting cavity communicates with the clamping slot through the annular opening part 103; an opening of the groove is located at one end of the first connecting piece away from the lighting cavity, and the second connecting piece is inserted into the groove in an interference manner; the lamp cap is sleeved on an outer side wall of the first connecting piece and covers the groove.

2. The lamp wick structure of claim 1, wherein an inner side wall of the groove and an end of the second connecting piece away from the lighting cavity enclose a sealing groove; the lamp wick structure further comprises a first sealant layer filled in the sealing groove.

3. The lamp wick structure of claim 1, wherein the first connecting piece comprises a mounting part, and the clamping slot is arranged on the mounting part; the mounting part comprises a support ring arranged in the clamping slot; a clamping space for clamping the lamp housing is formed between an outer side wall of the support ring and an inner side wall of the clamping slot.

4. The lamp wick structure of claim 3, wherein the support ring comprises an annular support part connected with an inner side wall of the annular opening part in an interference manner, and a first guide part for guiding the lamp housing to be inserted into the clamping space; and/or the lamp wick structure further comprises a second sealant layer filled in the clamping space.

5. The lamp wick structure of claim 1, wherein the first connecting piece comprises a mounting part, a connecting arm and a conversion part, and the clamping slot is arranged on the mounting part, the groove is arranged on the conversion part, the connecting arm is connected between the mounting part and the conversion part, the conversion part and the mounting part are both cylindrical, the connecting arm is in a frustum shape; the conversion part, the mounting part and the connecting arm are all coaxially arranged, a radius of the conversion part is smaller than that of the mounting part; and the lamp cap is sleeved on an outer side wall of the conversion part.

6. The lamp wick structure of claim 1, wherein one end of the second connecting piece near the lighting cavity is provided with a second guide part for guiding the second connecting piece to be inserted into the groove.

7. The lamp wick structure of claim 1, wherein the lamp cap is provided with a first electrode and a second electrode; and the lamp wick assembly comprises a light source assembly installed on the first connecting piece and positioned in the lighting cavity, a first circuit route electrically connected between the first electrode and a first end of the light source assembly, and a second circuit route electrically connected between the second electrode and a second end of the light source assembly.

8. The lamp wick structure of claim 7, wherein the first connecting piece is provided with a first through hole and a second through hole, the first through hole and the second through hole are communicated between the groove and the lighting cavity; one end of the first circuit route is electrically connected with the first end of the light source assembly through the first through hole, and another end is electrically connected with the first electrode; one end of the second circuit route is electrically connected with the second end of the light source assembly through the second through hole, and another end is electrically connected with the second electrode.

9. The lamp wick structure of claim 7, wherein the first circuit route comprises a first electronic component, a first wire electrically connected between the first electronic component and the first end of the light source assembly, and a second wire electrically connected between the first electronic component and the first electrode; the second circuit route comprises a second electronic component, a third wire electrically connected between the second electronic component and the second end of the light source assembly, and a fourth wire electrically connected between the second electronic component and the second electrode; the first electronic component is a resistance element, a constant current IC element or a metal wire; the second electronic component is a resistance element, a constant current IC element or a metal wire; and/or the light source assembly is a filament LED light source element or a planar LED light source element.

10. A lamp, comprising the lamp wick structure of claim 1.

* * * * *